US007073236B2

(12) United States Patent
Xue et al.

(10) Patent No.: US 7,073,236 B2
(45) Date of Patent: Jul. 11, 2006

(54) ELECTRONIC ARTICLE SURVEILLANCE (EAS) TAG COMPATIBLE WITH MECHANICAL AND MAGNETIC UNLOCKING DETACHERS

(76) Inventors: Hua J. Xue, 18819 Bellgrove Cir., Saratoga, CA (US) 99070; Jianping Sun, 65 RenDe Road 6-701, Shanghai, China 200434 (CN)

( * ) Notice: Subject to any disclaimer, the term of this patent is extended or adjusted under 35 U.S.C. 154(b) by 0 days.

(21) Appl. No.: 10/696,844

(22) Filed: Oct. 29, 2003

(65) Prior Publication Data

US 2005/0091809 A1 May 5, 2005

(51) Int. Cl.
*A44B 9/00* (2006.01)
*E05B 65/00* (2006.01)
*F16B 21/00* (2006.01)

(52) U.S. Cl. ...................................... 24/704.1; 70/57.1

(58) Field of Classification Search ............... 24/704.1, 24/704.2; 70/57.1, 276, 279.1

See application file for complete search history.

(56) References Cited

U.S. PATENT DOCUMENTS 3,858,280 A * 1/1975 Martens ...................... 70/57.1
3,974,581 A * 8/1976 Martens et al. ............ 24/704.2
4,339,853 A * 7/1982 Lipschitz .................... 70/57.1
4,531,264 A * 7/1985 Minasy ....................... 70/57.1
4,903,383 A * 2/1990 Gartshore .................. 24/706.8
5,077,872 A * 1/1992 Guthammar ............... 24/704.1
5,572,191 A * 11/1996 Lundberg ................... 70/57.1
6,631,629 B1 * 10/2003 Fuss et al. .................... 70/57.1
6,722,166 B1 * 4/2004 Skjellerup ................... 70/57.1

* cited by examiner

*Primary Examiner*—Robert J. Sandy
(74) *Attorney, Agent, or Firm*—Bo-In Lin

(57) ABSTRACT

A security tag includes a tag body and an attaching pin for attaching the tag body to a protected article. The security tag further includes a locking mechanism for releasably preventing the attaching pin from being removed from the protected article. The locking mechanism is provided for mechanically or magnetically released the attaching pin for detaching the tag body from the article. In a preferred embodiment, the locking mechanism further includes a plurality of balls for tightly holding to the attaching pin for releasably preventing the attaching means from being removed from the article. The locking mechanism includes a mechanical unlocking probe finger for applying a mechanical force to release the balls from the attaching pin. The locking mechanism further includes an unlocking magnet for applying a magnet force to release the balls from the attaching pin.

7 Claims, 3 Drawing Sheets

ELECTRONIC ARTICLE SURVEILLANCE (EAS) TAG COMPATIBLE WITH MECHANICAL AND MAGNETIC UNLOCKING DETACHERS

FIELD OF THE INVENTION

The present invention relates generally to apparatuses and method for providing a security tag for use in an electronic article surveillance (EAS) system. More particularly, this invention is related to a security tag for use in an EAS system wherein the security tag is compatible and can be unlocked by either a magnetic or mechanical tag-detaching machine.

BACKGROUND OF THE INVENTION

Conventional security tags for affixing to an article to operate with the electronic article surveillance (EAS) systems for inventory control or anti-theft operations generally have two types of attaching mechanisms. The first type of attaching mechanism is releasable by a finger key to mechanically probe and push an unlocking mechanism to detach the tag. The second type of attaching mechanism is releasable by applying a magnetic detacher to magnetically pull up a metallic spring and release a locking pin. These two types of tags are not mutually compatible and every tag can be operable only with one type of detaching machines. The applicability of either type of security tags is therefore limited only to only one system thus limiting the scopes of the marketability of the tags and that often causes inconvenience and cost increase due to this limitation.

Another disadvantage often associated with a mechanical type of tags is the grooves employed for engaging and locking the pin for securely locking the tag. During the unlocking process, in pulling out the pin, the grooves on the pin with sharp edges, as that required for engaging and securely locking the pin, may pull the threads of the more delicate fabric materials or materials wrapped around the pin thus causing damages to the attached articles. Even with special cares, the damages may still occur and that make the application of this types of tags less than desirable on more delicate fabrics even when these clothes made with delicate fabrics are often more expensive and must be more closely monitored.

For the purpose of inventory control and anti-theft by unauthorized removal of an article from a control area, electronic article surveillance systems are established with system transmitter and system receiver to establish a surveillance zone. An EAS tag is attached to each protected article. The tag includes a marker or a sensor to interact with a signal transmitted by the system transmitter to the surveillance zone. The interaction generates another signal received by the system receiver. Thus when a protected article is removed to a surveillance zone, a signal is received by the system receiver to indicate an EAS tagged article is removed to the surveillance zone without proper authorization. In order to provide reusable tags, the EAS tags typically include releasable attachment mechanism to attach the tag to the protected article and then released by authorized persons when the protected article is authorized to move to a surveillance zone. By allowing an authorized person to release the tag from an attached article by the use of special tools or detachers, the alarm signal of article removal will be received only when the removal is unauthorized.

Many prior art patents have disclosed different types of attaching and detaching mechanisms to implement on an EAS tag. These patents include U.S. Pat. Nos. 3,914,829, 3,942,829, 3,947,930, 4,311,992, 5,031,756, and 5,426,419 are herein incorporated by reference in this Application. As the tags disclosed in these Patents employ the mechanical detachers, the tags are not compatible and not operable with a magnetic detacher.

However, as discussed above, the detaching mechanisms for conventional attachment mechanisms are limited by their applications only to either the mechanical or magnetic types of detachers. For these reasons, a need still exists in the art of design and manufacturing of the EAS tag attachment-detachment mechanisms to provide new and improved designs and configurations to enable a person of ordinary skill in the art to overcome such limitations.

SUMMARY OF THE PRESENT INVENTION

It is therefore an object of the present invention to provide a new and improved attaching-detaching mechanism that would be compatible and operable by either a mechanical or magnetic detacher. The EAS tags as disclosed in this invention can be employed with surveillance systems provided with either types of detaching machines or tools such that the above-mentioned limitations and difficulties can be resolved.

Specifically, it is an object of this invention to provide a attaching-detaching mechanism that has a pin that is inserted and locked by a spring-pressed balls. The spring can be released by using either a finger-key to probe and pushing a spring-releasing mechanism or by applying a magnetic force to pull the metallic spring away from the ball-pressing position to release the balls to detach the pin from the spring-pressed ball-lock. By the use of the pressed balls as a locking mechanism, the pin used for attaching and locking is made with smooth surface without requiring a groove such that the disadvantage associated with grooved pin is eliminated.

Furthermore, it is the object of this invention to provide a attaching-detaching mechanism for an EAS tag that not only can be operated with either a mechanical or a magnetic detacher, but also the strength of attachment can be conveniently adjusted by simply changing to a spring of different pressing force. The applications of an EAS tag as disclosed by this invention thus can provide broader scopes and more flexibilities for protecting different types of tagged articles monitored by the electronic surveillance systems.

Briefly, in a preferred embodiment, the present invention discloses an EAS tag that includes an attaching-detaching mechanism for attaching to an article wherein the attaching-detaching mechanism can be released by either applying a mechanical pushing means or by a magnetic means to detach the attaching-detaching mechanism from an attache article. In a preferred embodiment, the attaching-detaching mechanism includes a locking mechanism for locking to an attachment pin. The locking mechanism is pressed by a pressing spring for tightening the locking mechanism to lock the attachment pin. The pressing spring is releasable by a mechanical pushing probe or a magnetic pulling force to release the locking mechanism to detach the attachment pin from the locking mechanism.

In a preferred embodiment, this invention further discloses a method for attaching/detaching an EAS tag. The method includes a step of providing an attaching-detaching mechanism releasable by either a mechanical pushing means or by magnetic releasing means. In a preferred embodiment, the step of providing said attaching-detaching mechanism further includes a step of locking an attachment pin and releasing and unlocking said attachment pin by applying either the mechanical pushing means or said magnetic releasing means.

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
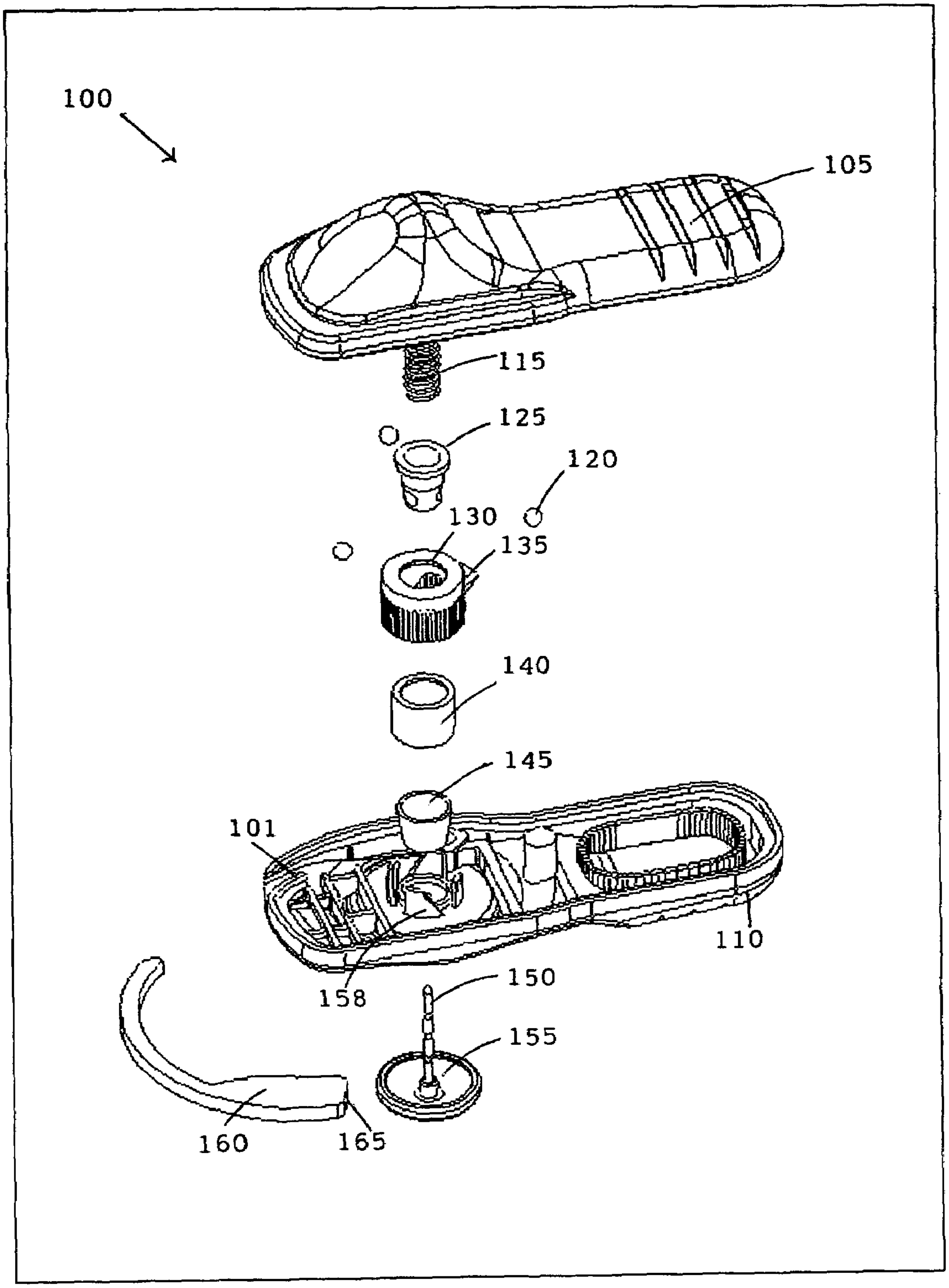
FIG. 1 is a perspective view of a disassembled security tag for releasably attaching to a tagged article implemented with a attaching-detaching mechanism of this invention.

FIG. 1 is a perspective view of a disassembled security tag 100 for operation with a detachable pin 150 supported on a nail-head 155 for attaching to a protected article that includes an attaching-detaching mechanism of this invention. The pin 150 is inserted through a hole 152 as that shown in FIG. 2 into an inner cup 145. The inner cup 145 is surrounded by an outer cylinder 140 which is then tightly engaged by a rotating-releasing cylinder 130 that has an engagement nose 135 sticks out from the rotating-releasing cylinder 130. The attaching-detaching mechanism further includes a ball holder 125 having three holes to admit three balls 120 into the inner space of the ball holder 125. A spring 115 is configured to engage the ball holder 125. As the top cover 105 push on the spring 115, the spring 115 presses down the ball holder 125 together with three balls 120 and force the ball holder 125 to reach to the lower part of the inner cup 145. As can be seen from FIG. 1, the inner cup 145 has a gradually reduced volume at the bottom and an expanded space on the top portion. As the ball holder 125 is pushed down, the three balls 120 are squeezed by the inner cup 145 to tightly press onto the pin 150 thus prevent the pin from being removed.

A special mechanical tool, e.g., a finger key probe 160 may be inserted through an opening 101 to push the releasing nose 135 to release the pin 150 from the three balls 120. When the releasing nose 130 is pushed, the rotating-releasing cylinder 135 begins to rotate and the releasing nose 130 is engaged to a sloped elevation pushing-base 158 supported on the bottom cover 110 that pushes the rotating-releasing cylinder 135 to a higher position further away from the bottom cover 110. The rotating-releasing cylinder 135 also push the ball-holder 125 to raise to a higher position while the inner cup 145 is held down by the outer cylinder 140 to remain at the same position. As the ball holder 125 reaches a higher position within the inner cup 145, the large space at the top portion of the inner cup 145 now allows more space surrounding the balls 120. Without the pressing force from the side wall of the inner cup 145 the balls begin to fall away from the pin 150 thus allows the pin to be released.

Figure 2:
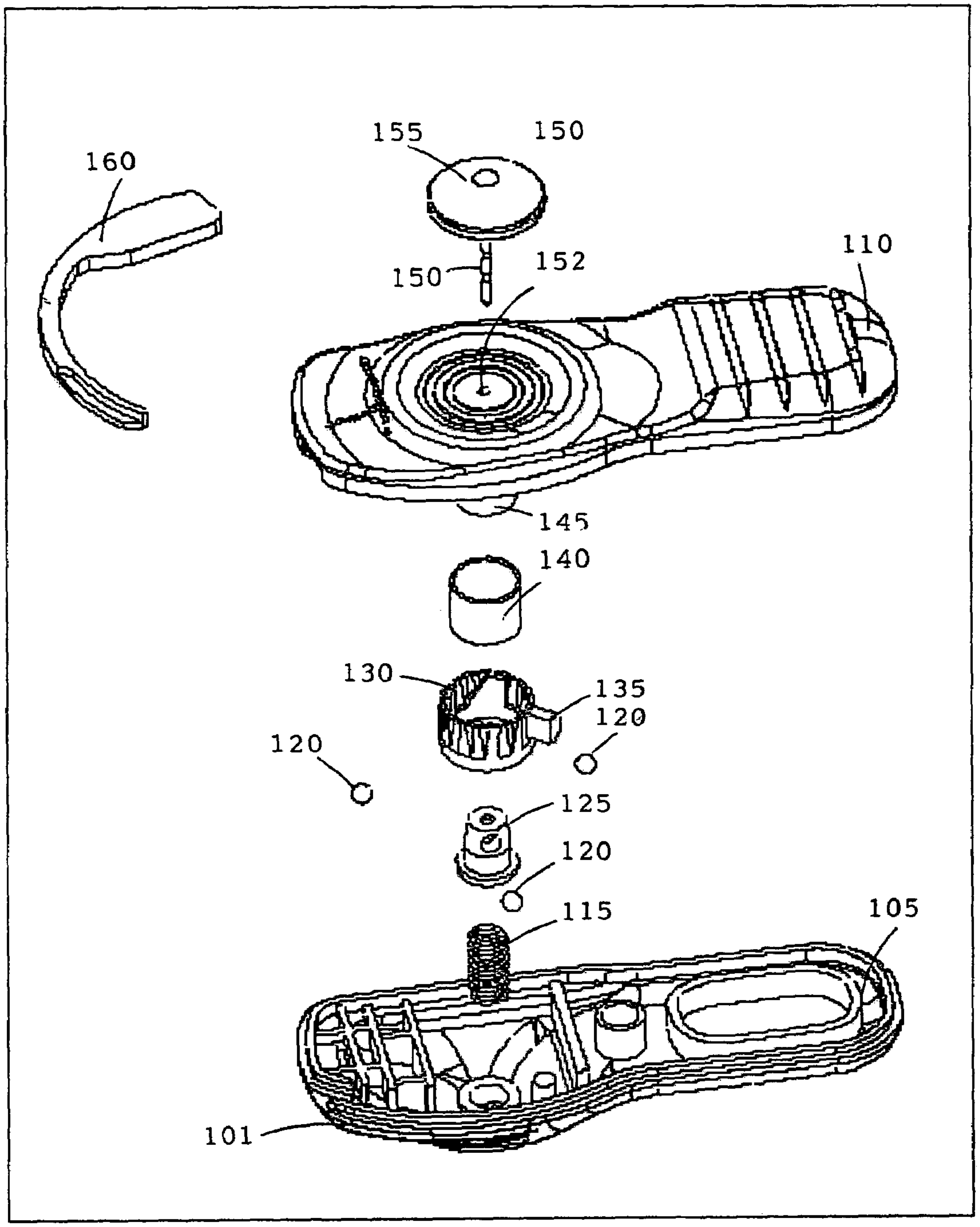
FIG. 2 is a top perspective view of a bottom cover of the security tag of FIG. 1 for this invention.
Figure 3:
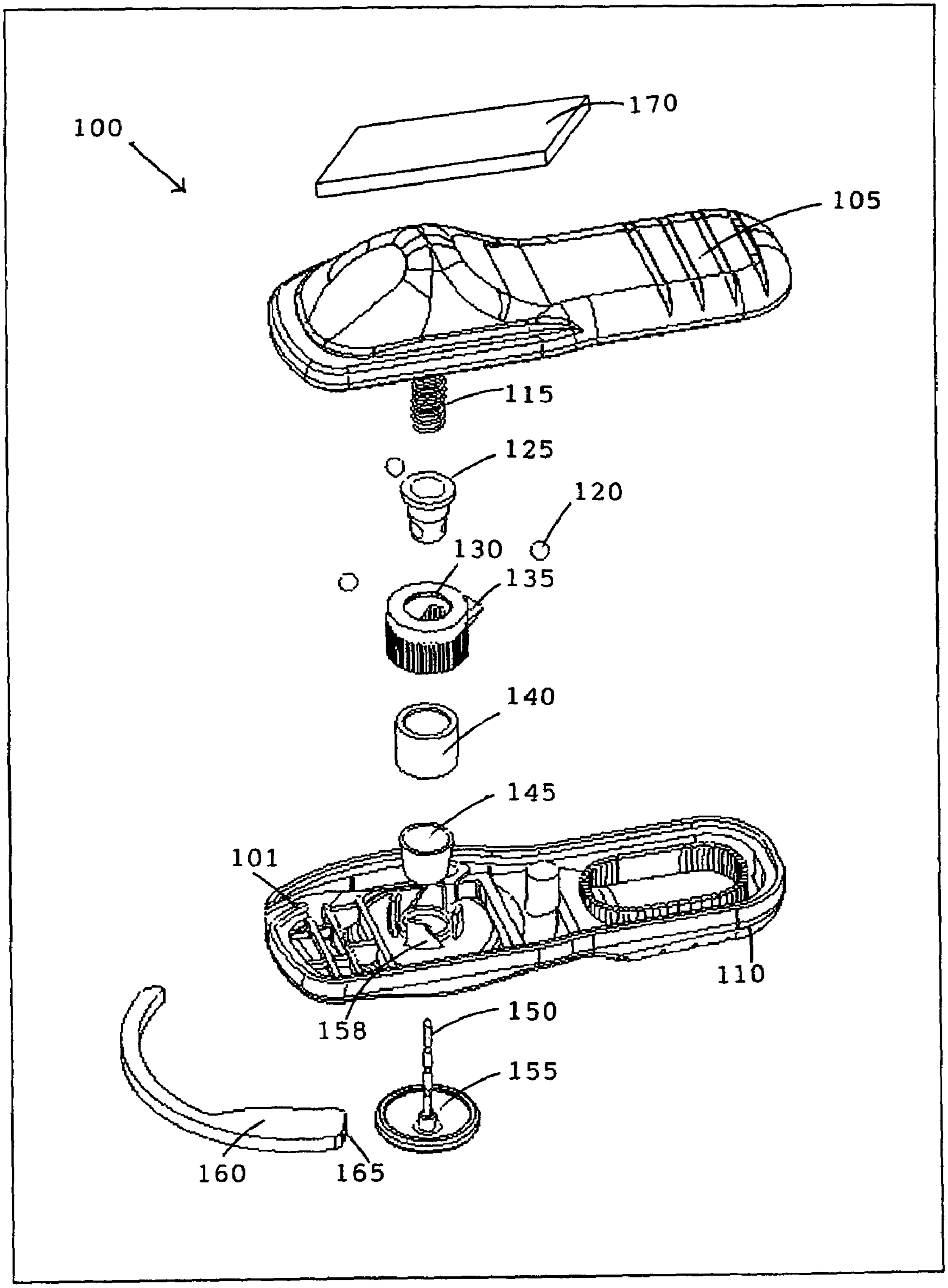
FIG. 3 FIG. 3 is a perspective view for showing a movement of an outer holding cup when an unlocking magnet is applied to release the locking pin from the security tag.

FIG. 2 is a top perspective view of the bottom cover 110 that include a hole 152 to allow the pin 150 to enter into the inner holding cup 145 such that the pin 150 is held by three balls as these balls are squeezed by the narrower surround side wall of the inner holding cup 145. FIG. 3 shows the unlocking mechanism by applying a magnetic unlocking means, e.g. a magnet 170 that is placed on top of the top cover 105. The magnet 170 asserting a pulling force on the spring and the ball holder 125 to move upward while the outer cup 140 engaged the inner cup 145 to keep the inner cup 145 at a fixed position. As the ball holder 125 is pulled up to an upper portion of the inner holding cup 145, the three balls have open space to move outward from the ball holder 124 thus fall away from the pin 150. The pin 150 is released and the security tag can be unlocked by pulling the pin out from the security tag 100.

According to FIGS. 1–3 and above descriptions, this invention discloses a security tag that includes a tag body and an attaching means for attaching the tag body to an article. The security tag further includes a locking means for releasably preventing the attaching means from being removed from the article wherein the locking means is provided for mechanically or magnetically released the attaching means for detaching the tag body from the article. In a preferred embodiment, the locking means further includes a plurality of balls for tightly holding to the attaching means for releasably preventing the attaching means from being removed from the article. In a preferred embodiment, the locking means further includes a mechanical unlocking means for applying a mechanical force to release the balls from the attaching means whereby the attaching means may be released and detached from the tag body. In a preferred embodiment, the locking means further includes a magnetic unlocking means for applying a mechanical force to release the balls from the attaching means whereby the attaching means may be released and detached from the tag body. In a preferred embodiment, the locking means further includes a ball tightening and loosening means for tightening the balls to the attaching means. And, the locking means further includes a mechanical unlocking means for applying a mechanical force to the ball tightening and loosening means for loosening the balls from the attaching means whereby the attaching means may be released and detached from the tag body. In a preferred embodiment, the locking means further includes a magnetic unlocking means for applying a mechanical force to release the balls from the attaching means whereby the attaching means may be released and detached from the tag body. In a preferred embodiment, the ball tightening and loosening means further includes a ball surrounding surface defining a restrict space and an expanded space for forcing the balls into the restrict space for tightening the balls to the attaching means. And, the mechanical unlocking means further applying a mechanical force to move the balls to the expanded space of the ball tightening and loosening means for loosening the balls from the attaching means whereby the attaching means may be released and detached from the tag body. In a preferred embodiment, the magnetic unlocking means further applying a magnetic force to move the balls to the expanded space of the ball tightening and loosening means for loosening the balls from the attaching means whereby the attaching means may be released and detached from the tag body. In a preferred embodiment, the ball tightening and loosening means further includes ball holding cup having a plurality of holes for each of the balls surrounded by the ball surrounding surface wherein the locking means pressing the ball holding cup for forcing the balls into the restrict space for tightening the balls to the attaching means. And, the mechanical unlocking means further applying a mechanical force to move the ball holding cup together with the balls to the expanded space of the ball tightening and loosening means for loosening the balls from the attaching means whereby the attaching means may be released and detached from the tag body. In a preferred embodiment, the magnetic unlocking means further applying a magnetic force to move the ball holding cup together with the balls to the expanded space of the ball tightening and loosening means for loosening the balls from the attaching means whereby the attaching means may be released and detached from the tag body. In a preferred embodiment, the security tag further includes a mechanical probe finger for pushing and applying a mechanical force onto the locking means to release the attaching means whereby the attaching means may be released and detached from the tag body. In another preferred embodiment, the security tag further includes a magnet for applying a magnetic force onto the locking means to release the attaching means whereby the attaching means may be released and detached from the tag body.

In essence, this invention further discloses a security tag that includes an attaching means for attaching the tag to a protected article. The security tag further includes a locking means for locking the attaching means for releasably preventing the attaching means from being removed from the protected article wherein the locking means is provided to be unlocked for releasing the attaching means from the tag by one of at two different kinds of unlocking means. In a preferred embodiment, the locking means is provided to be unlocked by a mechanical unlocking and a magnetic unlocking means. In a preferred embodiment, the security tag includes a mechanical probe finger for pushing and applying a mechanical force onto the locking means to release the attaching means whereby the attaching means may be released and detached from the tag body. In a preferred embodiment, the security tag includes a magnet for applying a magnetic force onto the locking means to release the attaching means whereby the attaching means may be released and detached from the tag body. In a preferred embodiment, the locking means further includes a plurality of balls for tightly holding to the attaching means for releasably preventing the attaching means from being removed from the article. In another preferred embodiment, the locking means further includes a mechanical unlocking means for applying a mechanical force to release the balls from the attaching means whereby the attaching means may be released and detached from the security tag. In another preferred embodiment, the locking means further includes a magnetic unlocking means for applying a mechanical force to release the balls from the attaching means whereby the attaching means may be released and detached from the security tag.

According to the disclosure made in this invention, the present invention further discloses a method for protecting an article by using an attaching means for attaching a security tag to a protected article. The method further includes a step of preventing the attaching means from being removed from the protected article by releaseably locking the attaching means and for unlocking and releasing the attaching means from the tag by either one of at two different kinds of unlocking means.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. A security tag comprising an attaching means for attaching said tag to a protected article further comprising:

a locking means for locking said attaching means for releasably preventing said attaching means from being removed from said protected article wherein said locking means is provided to be unlocked for releasing said attaching means from said tag by one of at two different kinds of unlocking means wherein each of said two kinds of unlocking means applying at least two different kinds of forces along at least two different directions to said locking means.

2. The security tag of claim 1 wherein:

said locking means is provided to be unlocked by a mechanical unlocking means applying a rotational force along a traversal direction and a magnetic unlocking means applying a magnetic force along a vertical direction to said locking means.

3. The security tag of claim 1 further comprising:

a mechanical probe finger for pushing and applying a rotational force along said traversal direction onto said locking means to release said attaching means whereby said attaching means may be released and detached from said tag body.

4. The security tag of claim 1 further comprising:

a magnet for applying a magnetic force along said vertical direction onto said locking means to release said attaching means whereby said attaching means may be released and detached from said tag body.

5. The security tag of claim 1 wherein:

said locking means further includes a plurality of balls for tightly holding to said attaching means for releasably preventing said attaching means from being removed from said article.

6. The security tag of claim 1 wherein:

said locking means further includes a mechanical unlocking means for mechanically applying a rotational force along said traversal direction to release said balls from said attaching means whereby said attaching means may be released and detached from said security tag.

7. The security tag of claim 1 wherein:

said locking means further includes a magnetic unlocking means for applying a magnetic force along said vertical direction to release said balls from said attaching means whereby said attaching means may be released and detached from said security tag.

* * * * *